US006695203B2

(12) United States Patent

Iki et al.

(10) Patent No.: US 6,695,203 B2
(45) Date of Patent: Feb. 24, 2004

(54) BOARDING PASS PROCESSING UNIT, BOARDING GATE READER, PERSON COLLATION UNIT, BOARDING SYSTEM, BOARDING PASS, BOARDING PASS PROCESSING METHOD, SERVICE KIOSK FOR BOARDING PASS

(75) Inventors: Amehiko Iki, Kyoto (JP); Ralph H. Eck, Inglewood, CA (US)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/013,669

(22) Filed: Dec. 13, 2001

(65) Prior Publication Data

US 2003/0111530 A1 Jun. 19, 2003

(51) Int. Cl.$^{7}$ .............................................. G06F 17/00

(52) U.S. Cl. ...................... 235/375; 235/376; 235/382; 235/384

(58) Field of Search ................................ 235/375, 376, 235/382, 384

(56) References Cited

U.S. PATENT DOCUMENTS

| | | | | | |
|---|---|---|---|---|---|
| 5,010,240 | A | * | 4/1991 | Sheldon | 235/382 |
| 5,051,565 | A | * | 9/1991 | Wolfram | 235/384 |
| 5,513,272 | A | * | 4/1996 | Bogosian, Jr. | 382/116 |
| 5,581,630 | A | * | 12/1996 | Bonneau, Jr. | 382/116 |
| 5,642,160 | A | * | 6/1997 | Bennett | 348/156 |
| 5,754,675 | A | * | 5/1998 | Valadier | 382/115 |
| 5,787,186 | A | * | 7/1998 | Schroeder | 382/115 |
| 5,920,053 | A | * | 7/1999 | DeBrouse | 235/375 |
| 5,960,100 | A | * | 9/1999 | Hargrove | 382/124 |
| 6,044,353 | A | * | 3/2000 | Pugliese, III | 705/5 |
| 6,119,096 | A | * | 9/2000 | Mann et al. | 705/5 |
| 6,137,895 | A | * | 10/2000 | Al-Sheikh | 382/115 |
| 6,158,658 | A | * | 12/2000 | Barclay | 235/384 |
| 6,219,439 | B1 | * | 4/2001 | Burger | 382/115 |
| 6,325,285 | B1 | * | 12/2001 | Baratelli | 235/380 |
| 6,335,688 | B1 | * | 1/2002 | Sweatte | 340/573.1 |
| 6,412,692 | B1 | * | 7/2002 | Miyagawa | 235/382 |

FOREIGN PATENT DOCUMENTS

JP 11301154 A * 11/1999

* cited by examiner

*Primary Examiner*—Karl D. Frech
*Assistant Examiner*—Daniel I Walsh
(74) *Attorney, Agent, or Firm*—Dickstein Shapiro Morin & Oshinsky LLP

(57) ABSTRACT

There is provided a boarding pass processing unit that can enable identification of a person-to-board to be easily performed in short time to thereby enhance services to persons-to-board and keep security. The boarding pass processing unit prints a face image of a person-to-board on his/her boarding pass. Accordingly, By making the person-to-board show his/her boarding pass, it can be easily judged whether the person possessing the boarding pass 10 is the proper owner of the boarding pass.

17 Claims, 14 Drawing Sheets

BOARDING PASS PROCESSING UNIT, BOARDING GATE READER, PERSON COLLATION UNIT, BOARDING SYSTEM, BOARDING PASS, BOARDING PASS PROCESSING METHOD, SERVICE KIOSK FOR BOARDING PASS

BACKGROUND OF THE INVENTION

1. Field of the Invention

The present invention relates to a boarding pass processing unit, a boarding gate reader, a service kiosk for boarding pass (a boarding pass issuing machine), a boarding pass, a person collation unit, and a boarding pass processing method with which security in air ports can be enhanced, and a boarding system having the boarding pass processing device and the boarding gate reader.

2. Description of the Related Art

It has been general that a person-to-board (i.e., a person who is expected to board a plane) move in an airport to get on a plane as follows.

A person-to-board registers a check-in at a check-in counter and also checks his/her baggage if necessary. The passenger is allowed to check in under the following condition:

(1) A plane has vacant seats, or
(2) The passenger has already made a reservation.

A person-to-board who has completed his/her check-in procedure is then subjected to magnetic examination of his/her body and X-rays examination of his/her hand baggage which are carried out to prevent passengers from bring dangerous things into planes. Thereafter, the person-to-board passes through a boarding gate and gets on his/her plane.

In order to keep security, the airport (airline company) checks whether any person who does not get on the plane (hereinafter referred to as "non-boarding person") exists in persons-to-board who have completed their check-in procedures before the plane takes off. Boarding passes (airline tickets) possessed by persons-to-board are used to identify the persons-to-board who have checked in and persons (passengers) who pass through the boarding gate and get on the plane. When there is a non-boarding person, the airline company calls or looks for the non-boarding person in the airport. In this case, the departure of the air plane may be delayed.

However, only contract contents such as the name of a person-to-board, a boarding-scheduled date, a flight No. of an air plane, a destination, the name of a departure air port, a fare, etc. are written on an air ticket. Therefore, only the check of the written matters of the boarding pass is insufficient to accurately identify the person-to-board.

Further, identification of persons-to-board is required to be needed in airports for detection of plane hijacking, boarding procedures (check-in, boarding to air planes, etc.) cancel of boarding passes, alteration of boarding-scheduled air planes, etc. In such cases, it is also required to check whether a person-to-board having a boarding pass is a proper person of the boarding pass concerned. Therefore, a clerk in charge requests persons-to-board to show not only their boarding passes, but also their identification cards (particularly, identification cards having face photographs), or present keywords such as reservation numbers, identification numbers, birthdays or the like which only the persons-to-board know, or credit cards with their names, and check the identification of the persons-to-board by using the means corresponding to the necessity at that time.

However, since no information to identify persons-to-board accurately is recorded on their boarding passes themselves, the clerk in charge waits until the persons-to-board show their identification cards or the like and then check the identifies of the persons-to-board every time the identification is needed. Therefore, much time is needed to check their identifies, and there is a problem that an identification work is not efficiently carried out.

Further, persons-to-board are required to carry their identification cards or the like and show them every time the identification is needed. Therefore, many persons-to-board feel burdensome, and this makes the persons-to-board feel displeased at the services.

Still further, since an automatic boarding identifying gate apparatus used for the boarding work is not provided with any function of identifying persons-to-board, it is possible that a person-to-board delivers his/her boarding pass to another person and a person other than the person-to-board gets on an airplane while posing as the original person-to-board.

SUMMARY OF THE INVENTION

The present invention has an object to provide a boarding pass processing unit, a boarding pass processing method, a boarding gate reader, a boarding pass, a service kiosk for boarding pass, a person collation unit and a boarding system with which identification of persons-to-board can be easily performed to enhance services to persons-to-board and keep the security.

In order to attain the above object, (1) a boarding pass processing unit of the present invention comprises:

- a boarding pass accepting portion for accepting a boarding pass;
- a control portion for identifying a person-to-board who is an owner of the boarding pass accepted by the boarding pass accepting portion, and judging whether the person-to-board should be allowed to board;
- a face image achieving portion for achieving an face image of the person-to-board who is the owner of the boarding pass accepted by the boarding pass accepting portion;
- a face image printing portion for printing the face image of the person-to-board achieved by the face image achieving portion is printed on the boarding pass accepted by the boarding pass accepting portion when the control portion judges that the person-to-board is allowed to board; and
- a boarding pass discharge portion for discharging the boarding pass on which the face image is printed by the face image print portion.

According to the above construction, the face image of a person-to-board is printed on a boarding pass accepted by the boarding pass accepting portion. The face image of the person-to-board to be printed on the boarding pass is achieved by the face image achieving portion. The face image achieving portion may achieve the face image of each person-to-board by taking a photograph of each person-to-board with a camera disposed in the neighborhood of the main body of the apparatus or by reading the face image of each person-to-board from an identification card or the like of the person-to-board.

Further, the control portion identifies each person-to-board who is an owner of a boarding pass, and judges whether the person-to-board is allowed to board. This judgment may be carried out, for example, by reading the identification card of the person-to-board and identify the person-to-board from the written matters of the identification card, or by making an operator carry out aural inquiries on persons-to-board, input the contents of the aural inquiries and then identify the persons-to-board from the input contents. Further, the judgment may be carried out by making inquiries about past criminal records, etc. of the persons-to-board to police stations, security companies, etc.

When the control portion judges that boarding is allowed to a person-to-board, the face image print portion prints on the boarding pass the face image of the person-to-board achieved by the face image achieving portion.

Accordingly, the person-to-board whose identification is completed and thus to which the boarding is allowed has a boarding pass on which his/her face image is printed. Therefore, by showing the boarding pass having his/her face image printed thereon to the clerk in charge, the person-to-board can make the clerk in charge identify that he/she is the proper owner of the boarding pass.

When a face image is printed on a boarding pass, a person-to-board having the boarding pass is not required to be identified again because the identity of the person-to-board has been checked.

Further, (2) the face image print portion is equipped with a face image data recording portion for recording on the boarding pass face image data achieved by coding the face image printed on the boarding pass by the face image print portion.

In this construction, the face image data achieved by coding the face image printed on the boarding pass are also recorded on the boarding pass. Therefore, at the boarding gate or the like, the face image data are read out from the boarding pass, a photograph of the face of a user having the boarding pass is taken and then the face image data and the face photograph are collated with each other, so that it can be easily judged with no labor whether the person-to-board is the proper owner of the boarding pass. Accordingly, no labor is needed to identify the person-to-board and the cost can be suppressed. In addition, the security can be enhanced.

Further, (3) a boarding gate reader of the present invention comprises:

- a boarding pass processing portion for accepting a boarding pass on which a face image of a person-to-board is printed, and reading boarding data recorded on the boarding pass;
- a face image data achieving portion for achieving face image data corresponding to coded face image of a person-to-board who is the owner of the boarding pass from which the boarding data are read out by the boarding pass processing portion;
- an image pickup portion for picking up an image of a person passing through a passage; and
- a control portion for collating the face image data of the person-to-board achieved by the face image data achieving portion with the face image picked up by the image pickup portion to identify the person-to-board, and prohibiting passage of the person-to-board when the identification of the person-to-board is negated.

In this construction, the face image data processing portion accepts the boarding pass on which the face image of the person-to-board is printed, and achieves the face image data corresponding to the coded data of the face image printed on the boarding pass. The face image data may be recorded on the boarding pass, or it may be managed in association with the boarding data recorded on the boarding pass in a center or the like and achieved from the center. The boarding gate reader collates the achieved face image with the face image of the person-to-board picked up by the image pickup device to identify the person-to-board. If the identity is not verified, the boarding gate reader prohibits the passage of the person-to-board.

The boarding gate reader may be of such a type that the passage is prohibited by closing a gate door provided in the passage, such a type that the passage is prohibited by restricting rotation of a turn bar in place of the gate door, such a type that the passage is prohibited by outputting an alarm without discharging the boarding pass inserted into the main body, such a type that the passage is prohibited by discharging the boarding pass, not from a discharge port, but from an insertion port, or the like.

Accordingly, a person who is passing and boarding through a boarding gate with another person's boarding pass can be prohibited from passing with no labor.

(4) When the control portion judges that the identity of a person-to-board is verified, the boarding pass processing portion cuts out and withdraws a face-image printed portion of the boarding pass of the person-to-board, which is accepted by the boarding pass processing portion, and also the remaining portion of the boarding pass is discharged.

In this construction, the portion on which the face photograph is printed is withdrawn. Therefore, when the face photograph of a passenger is needed after an air plane takes off or the like, the face photograph of the passenger can be immediately achieved.

Conversely, the portion of the accepted boarding pass on which the face image of the person-to-board is printed may be cut out and discharged, and the remaining portion may be withdrawn.

In this case, the side at which the face image is printed can be practically used when the person-to-board is afterwards identified by the clerk in charge. For example, when a person-to-board intends to make a plane connection in an arrival airport, the person-to-board can use the face-image printed portion when he/she takes his/her baggage in the arrival airport.

(5) By providing the boarding pass processing unit and the boarding gate reader can be constructed a boarding system in which the labor needed to the security in the airport can be sufficiently reduced and also the security can be enhanced.

(6) Further, a service kiosk for boarding pass of the present invention comprises:

- a medium accepting portion for accepting insertion of a recording medium in which face image data corresponding to coded face image of an owner are recorded;
- an image pickup portion for picking up an image of a person who inserts the recording medium accepted by the medium accepting portion;
- a control portion for collating the face image data recorded in the recording medium accepted by the medium accepting portion with the face image of the person who inserts the recording medium, the face image being picked up by the image pickup portion; and
- a boarding pass issuing portion for issuing a boarding pass indicated when the control portion verifies the identity of the person-to-board.

In this construction, when the recording medium in which the face image data corresponding to the coded face image of the owner are recorded is accepted in the medium accepting portion, the face image of the person who inserts the recording medium is picked up by the image pickup portion. Normally, an IC card in which ID and face image data are recorded, such as a Smart Card, is issued to each privilege customer member of an airline company (Frequent Flyer) in advance. The control portion collates the face image picked up by the image pickup portion with the face image recorded in the accepted recording medium to judge the identity of the person-to-board. When the identify is verified, the boarding pass issuing portion issues an indicated boarding pass.

Here, the face image picked up by the image pickup portion maybe printed on the boarding pass thus issued. When the boarding pass issuing portion issues the boarding pass, the check-in procedure may be carried out on the person-to-board to which the boarding pass is issued.

(7) A person collation unit of the present invention comprises:

a boarding pass accepting portion for accepting a boarding pass on which face image data achieved by coding the face image of an owner is printed;

an image pickup portion for picking up an image of a person who inserts the boarding pass accepted by the boarding pass accepting portion;

a control portion for collating the face image data recorded in the boarding pass accepted by the boarding pass accepting portion with the face image of the person who inserts the boarding pass, the face image being picked up by the image pickup portion to judge the identity of the person; and a display portion for displaying the judgment result in the control portion.

In this construction, when the boarding pass on which the face image data corresponding to the coded face image of the owner is printed is accepted, the identity between the face image data recorded in the boarding pass and the person who inserts the boarding pass is judged, and the judgment result is displayed. Accordingly, if this apparatus is disposed at an X-ray examination place, a check room, etc., the identification of persons-to-board can be properly carried out at these places.

DETAILED DESCRIPTION OF THE PREFERRED EMBODIMENTS

Preferred embodiments according to the present invention will be described.

Figure 1:
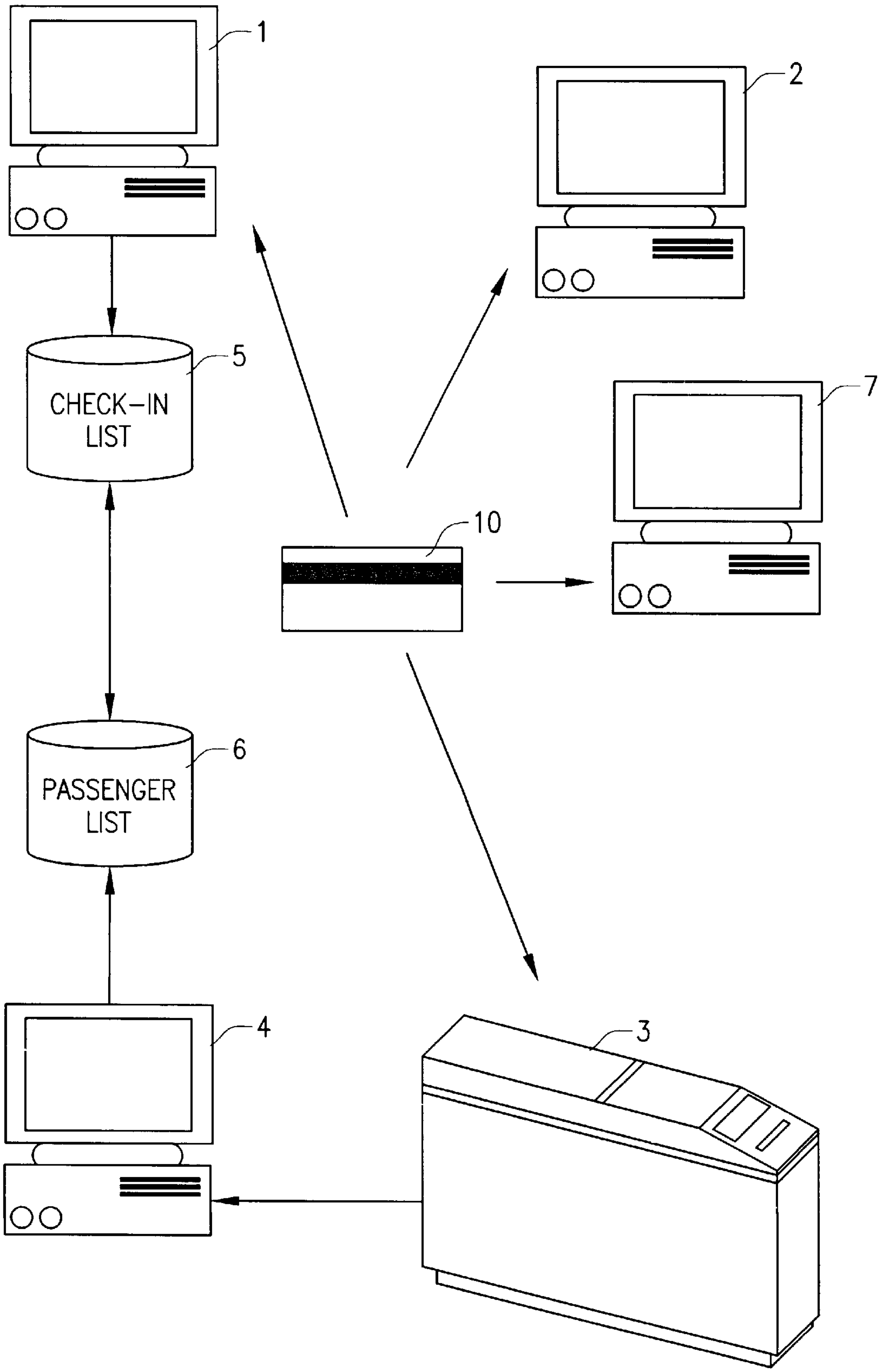
FIG. 1 is a diagram showing the construction of a boarding system according to an embodiment of the present invention.

FIG. 1 is a diagram showing the construction of a boarding system according to an embodiment of the present invention. The boarding system of this embodiment includes a check-in terminal 1 which is mounted on a check-in counter and carries out check-in procedures for persons-to-board, a boarding pass processing unit 2 for printing an face image of each person-to-board on a boarding pass 10, a boarding gate reader 3 for judging on the basis of information recorded on the accepted boarding pass 10 whether each person-to-board is allowed to pass through a boarding gate, a control terminal 4 for managing persons-to-board passing through the boarding gate, a check-in list 5 for registering persons-to-board for which the check-in procedures have been completed by the check-in terminal 1, a passenger list 6 for registering persons-to-board (passengers) who have passed and boarded through the boarding gate, and a person collating unit 7 which is disposed at an X-ray examination place, a check room, etc. and identifies the persons-to-board.

The persons-to-board for which the check-in procedures have been completed by the check-in terminal 1 are registered in the check-in list 5. The control terminal 4 registers the persons-to-board passing and boarding through the boarding gate as passengers in the passenger list 6.

The check-in terminal 1, the boarding pass processing unit 2, the control terminal 4 and the person collating unit 7 are connected to a system server (not shown). A boarding gate reader 3 notifies persons-to-board passing and boarding through the boarding gate to the control terminal 4. The system server (not shown) collates the persons-to-board registered in the check-in list 5 (the persons-to-board for which the check-in procedures have been completed) with the persons-to-board registered in the passenger list 6 (passengers who pass and board through the boarding gate) to check whether any person-to-board who has not yet passed and boarded through the boarding gate exists in the persons-to-board for which the check-in procedures have been completed.

Figure 2:
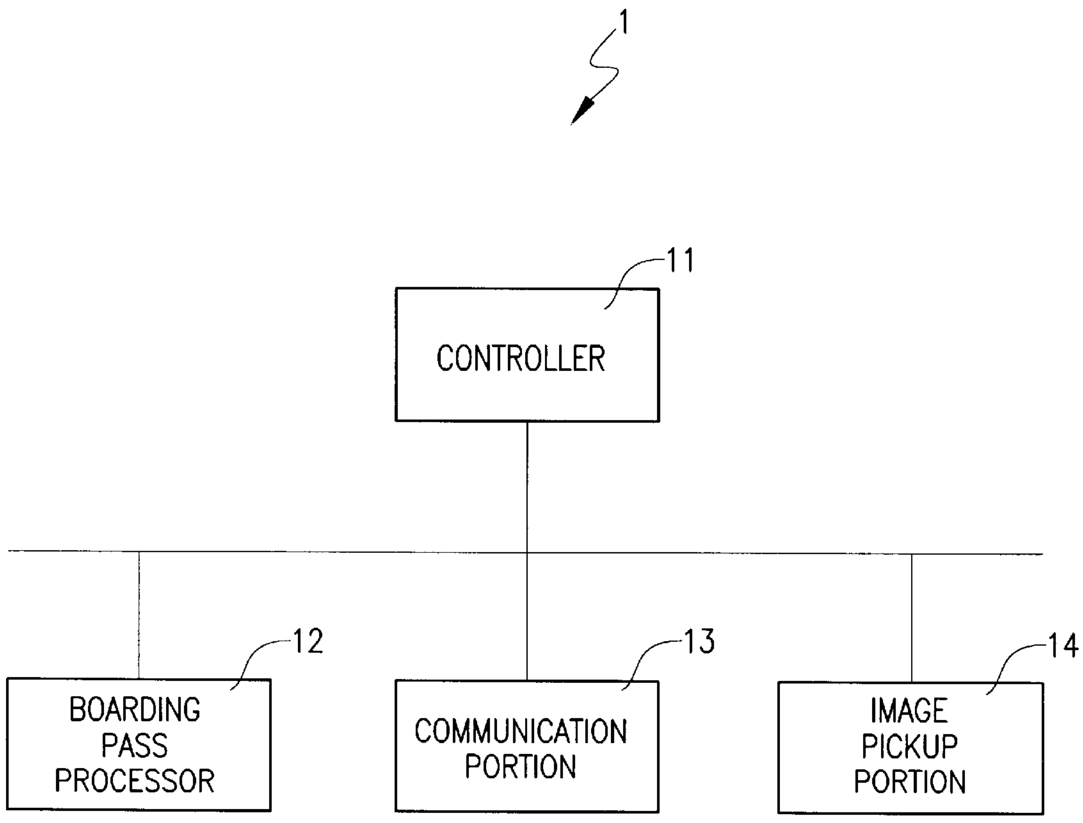
FIG. 2 is a diagram showing the construction of a check-in terminal according to an embodiment of the present invention.

FIG. 2 is a block diagram showing the construction of the check-in terminal 1.

The check-in terminal 1 includes a controller 11 for controlling the operation of the main body thereof, a boarding pass processor 12 for reading information recorded on the accepted boarding pass 10, a communication portion 13 for controlling data communications with other devices, and an image pickup portion 14 for picking up an image of the face of each person-to-board for which the check-in procedures are being carried out at the check-in counter.

Figure 3:
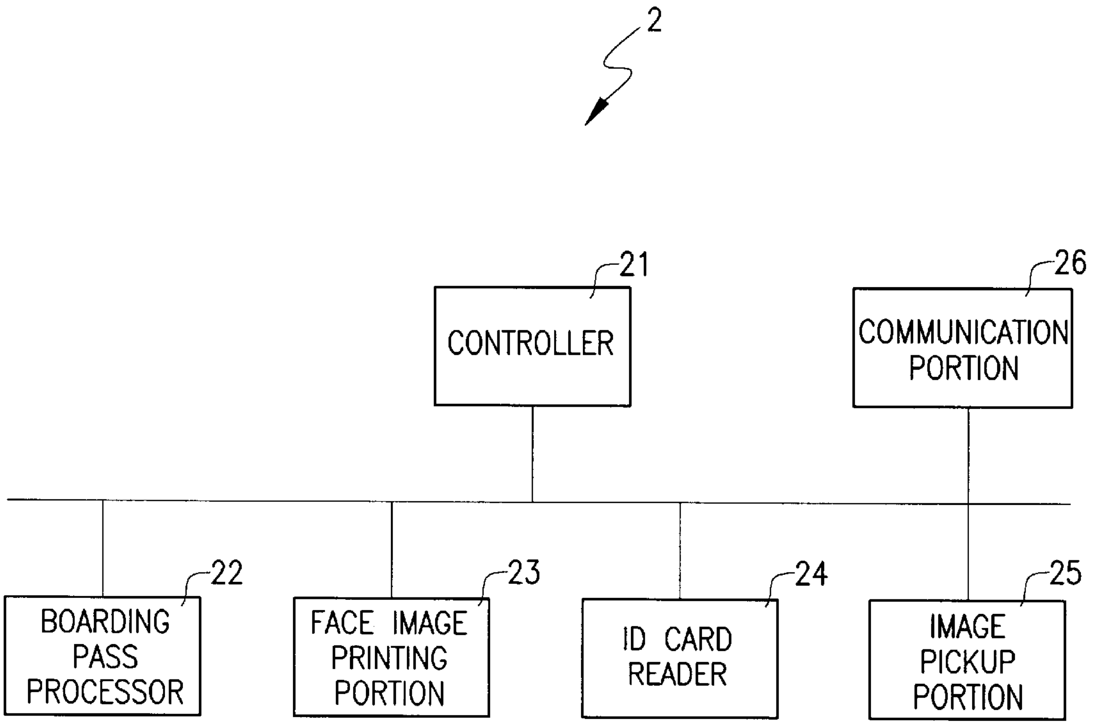
FIG. 3 is a diagram showing the construction of a boarding pass processing unit according to an embodiment of the present invention.

FIG. 3 is a block diagram showing the construction of the boarding pass processing unit.

The boarding pass processing unit 2 includes a controller 21 for controlling the operation of the main body thereof, a boarding pass processor 22 for reading out information recorded on the accepted boarding pass 10, a face image printing portion 23 for printing the face image of each person-to-board on the boarding pass 10 accepted by the boarding pass processor 22, an identification card reader 24 for reading the written matters on an identification card shown by each person-to-board, an image pickup portion 25 for picking up an image of the face image of each person-to-board, and a communication portion 26 for controlling data communications with other devices. The identification card reader 24 has a scanner.

The boarding pass processing unit 2 may be provided with a function of transmitting ID numbers and other written matters of identification cards read out by the identification card reader 24 to a server device (not shown) for managing personal criminal records, etc. to inquire about past criminal records of the persons-to-board.

Figure 4:
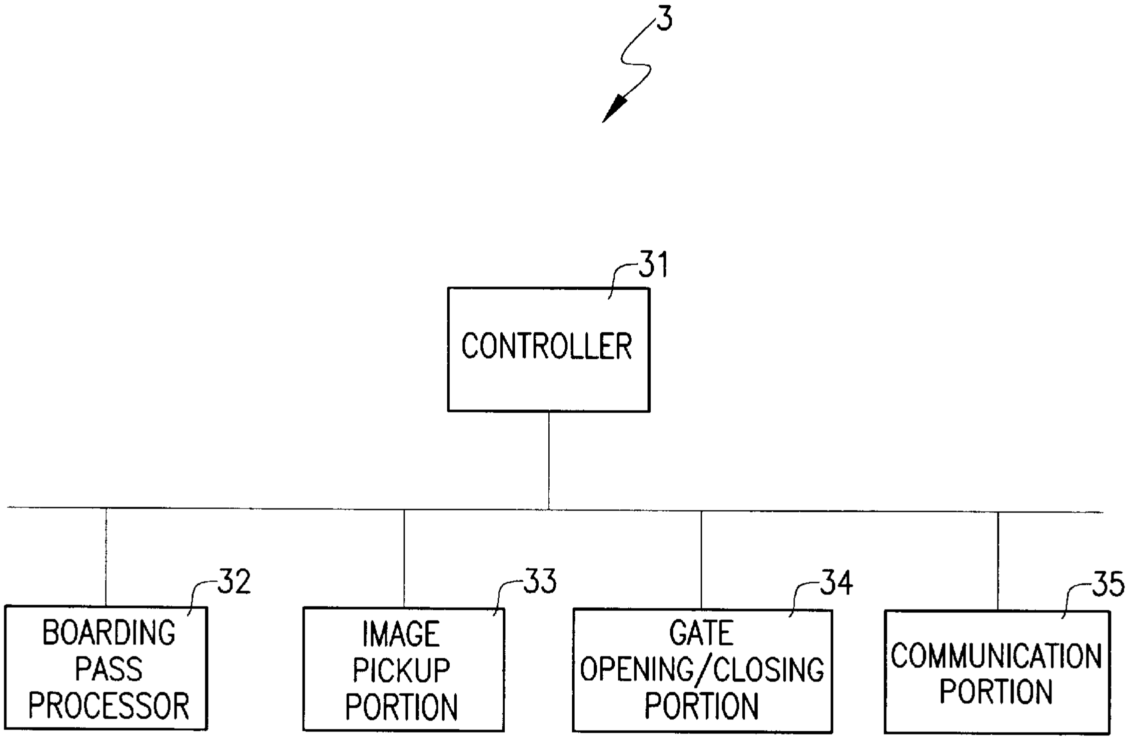
FIG. 4 is a diagram showing the construction of a boarding gate reader according to an embodiment of the present invention.

FIG. 4 is a block diagram showing the construction of the boarding gate reader.

The boarding gate reader 3 includes a controller 31 for controlling the operation of the main body thereof, a boarding pass processor 32 for reading out information recorded in the accepted boarding pass 10, an image pickup portion 33 for picking up an image of the face of each person-to-board passing through a passage (boarding gate), a gate opening/closing portion 34 for controlling the opening/closing operation of a gate door through which the passage of person-to-board is restricted, and a communication portion 35 for controlling data communications with other devices.

Figure 5:
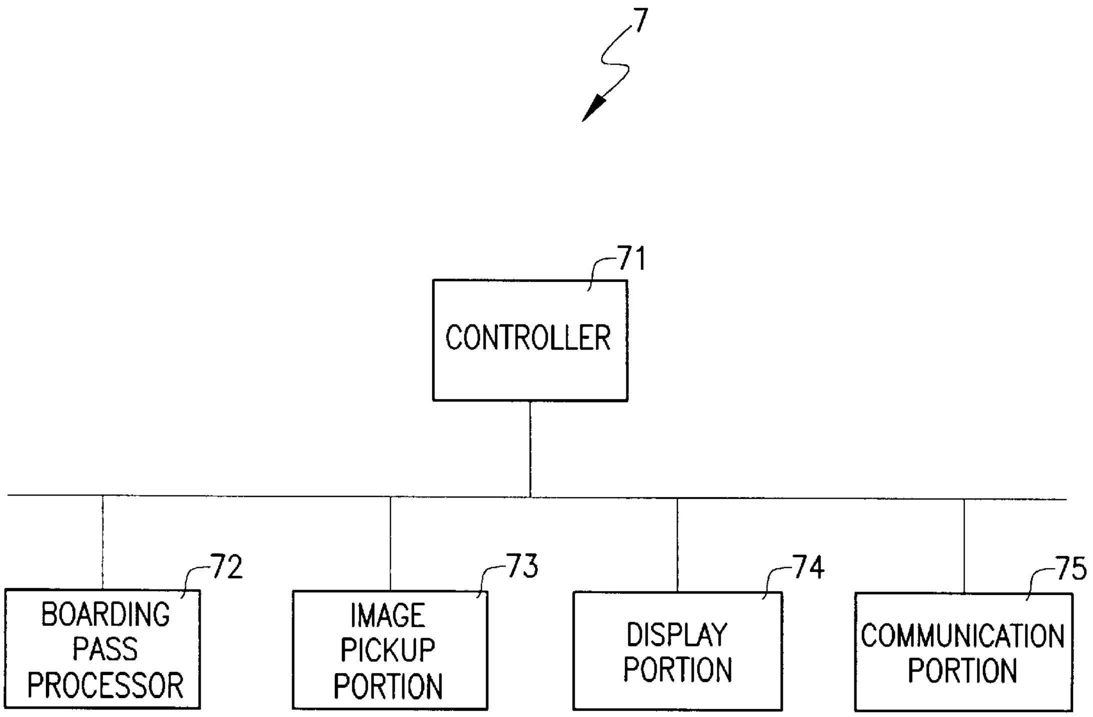
FIG. 5 is a diagram showing the construction of a person collation unit according to an embodiment of the present invention.

FIG. 5 is a block diagram showing the construction of the person collation unit.

The person collation unit 7 includes a controller 71 for controlling the operation of the main body thereof, a boarding pass processor 72 for reading the face image of each person-to-board and the face image data which are recorded on the accepted boarding pass 10, an image pickup portion 73 for picking up an image of the face image of each person-to-board, a display portion 74 for displaying the operation state, and a communication portion 75 for controlling data communications with other devices.

The above respective devices constituting the boarding system are connected to one another on-line.

Next, the operation of the boarding system according to the embodiment of the present invention will be described.

A person-to-board purchases and owns a boarding pass 10 at a travel agency, an counter of an airline company or the like in advance. Further, there is such a case that a person-to-board reserves boarding to an airline company by using the Internet or the like.

Figure 6A:
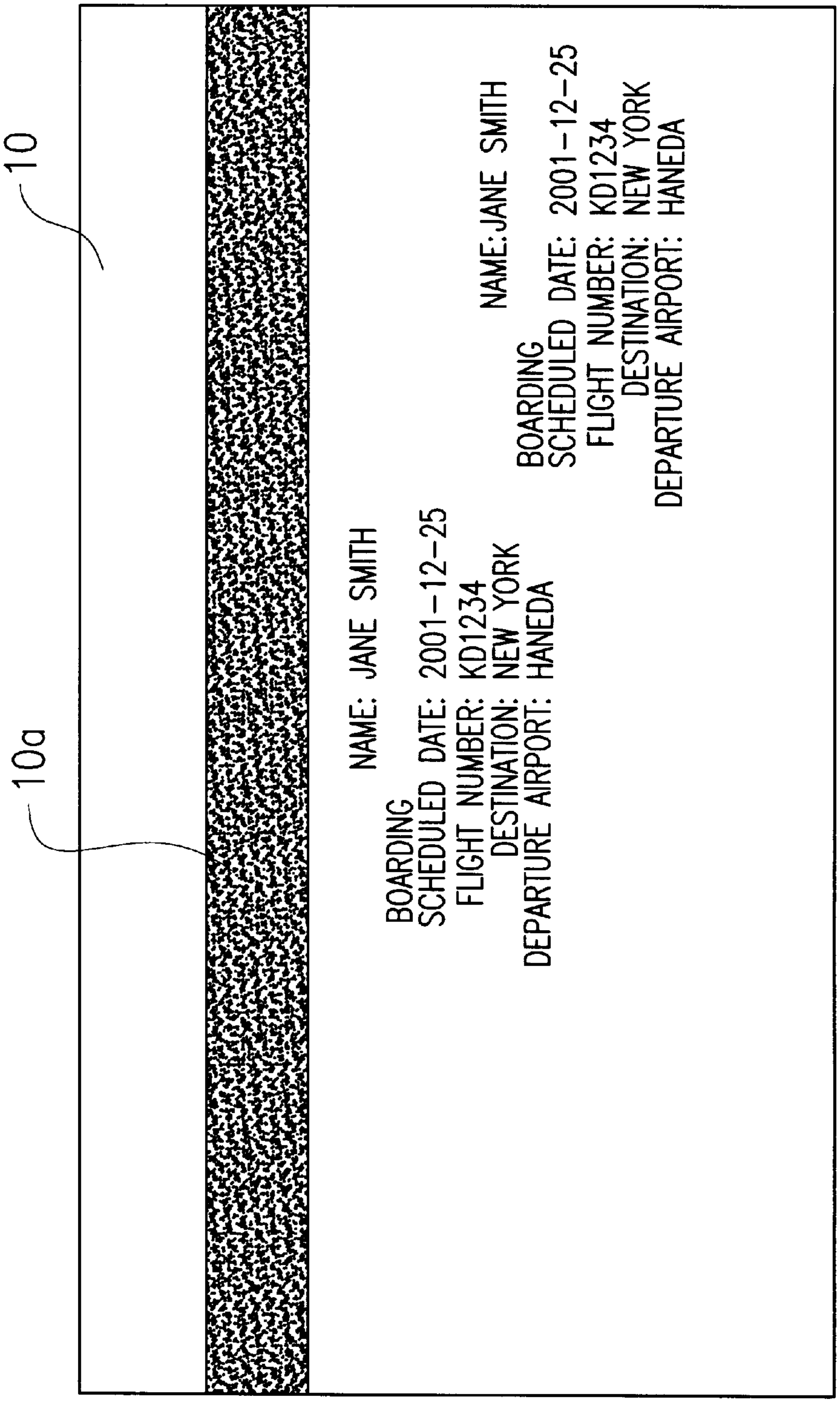
FIG. 6 is a diagram showing a boarding pass on which a face image is printed.

The person-to-board goes to any one of a check-in counter and a security check counter at which the boarding pass processing unit 2 is disposed while having the boarding pass 10. In this case, information pieces such as the name of the person-to-board, a boarding-scheduled date, a flight number, a destination, a departure airport, etc. are printed at two places on the surface of the boarding pass 10 possessed by the person-to-board as shown in FIG. 6A. The boarding pass 10 is provided with a magnetic recording portion 10*a*, and the information pieces printed on the surface of the boarding pass 10 are recorded as magnetic data.

There is such a case that a person-to-board purchases an electronic airline ticket from an airline company by using the Internet or the like and carries a medium certifying the electrical airline ticket to an airport. For example, when information indicating that a user purchases an electronic airline ticket and various other information pieces are printed out on a normal sheet at home by using a normal sheet printer, the boarding pass 10 is the normal sheet. As described above, the boarding pass 10 which the person-to-board brings to the check-in counter is a medium for certifying that the person-to-board has a boarding right.

First, a case where a person-to-board goes to a check-in counter to carry out check-in procedures will be described.

In this case, at the check-in counter, a clerk in charge receives a boarding pass from the person-to-board and registers a check-in for the person-to-board on the basis of the information printed on the surface of the boarding pass. When an input for the check-in registration is carried out, the check-in terminal 2 registers the person-to-board in the check-in list 5 on the basis of the information thus input.

Next, a case where a person-to-board goes to a security counter before going to the check-in counter to carry out the security check and then goes to the check-in counter to carry out the check-in procedures will be described.

The processing of the check-in counter described below is the same as the processing which is carried out at the security check counter after the person-to-board goes to the check-in counter.

Figure 7:
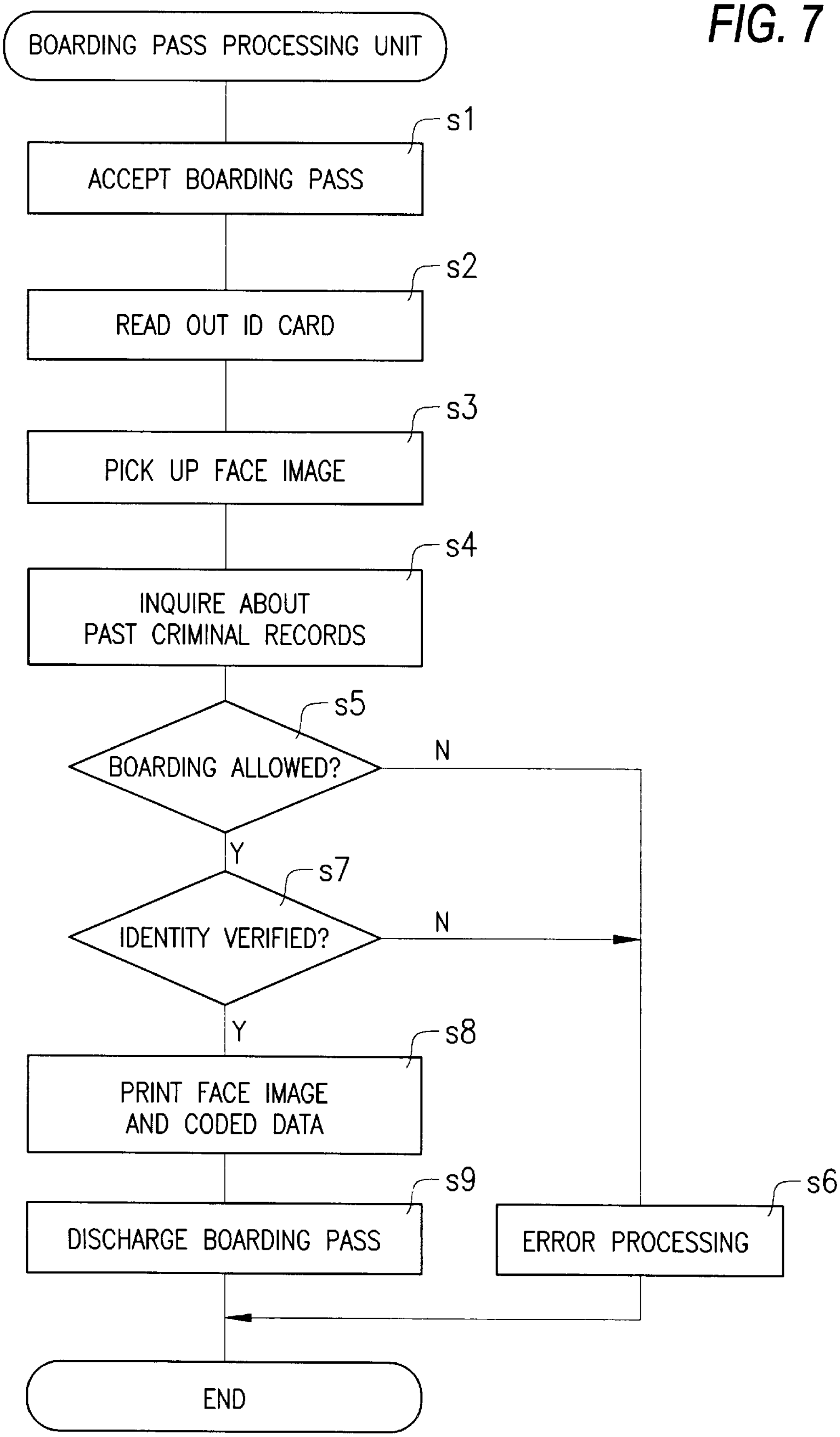
FIG. 7 is a flowchart showing the operation of the loading pass processing unit according to the embodiment of the present invention.

FIG. 7 is a flowchart showing the operation of the boarding pass processing unit.

The boarding pass processing unit 2 accepts the boarding pass 10 possessed by the person-to-board in the boarding pass processor 22, and reads information recorded in the magnetic recording portion 10*a* of the boarding pass 10 (s1). The contents printed on the boarding pass 10 may be optically read out. The boarding pass processing unit 2 reads out an identification card with a face photograph of the person-to-board in the identification card reader 4 (s2), and an image of the face of the person-to-board is picked up in the image pickup portion 25 (s3).

The processing of s2, s3 may be changed in order. Further, biometrics information (iris pattern, fingerprint or the like) with which person collation can be performed may be read out from the identification card with face photograph in s2.

The boarding pass processing unit 2 transmits the ID number and other written matters read out from the identification card by the identification card reader 24 to a server device for managing personal criminal records, etc. to inquire about past criminal records on the person-to-board concerned (s4), and then judges on the basis of the reply from the server device on the inquiry whether the person-to-board is allowed to board (s5).

In s5, the judgement as to whether the boarding of the person-to-board is allowed or not is carried out while carrying out the processing of collating the written matters read out from the ID card by the identification card reader 24 with the information recorded in the magnetic recorder 10*a* of the boarding pass 10 to judge whether the person-to-board is the proper owner of the boarding pass.

The judgment as to whether the boarding of the person-to-board is allowed or not may be carried out in s5 by using the various information achieved in s2 without making inquiries to the server device in s4.

If it is judged in s5 that the boarding of the person-to-board is not allowed, the boarding pass processing unit 2 carries out error processing in s6 and finishes this main processing.

Conversely, when the boarding pass processing unit 2 judges that the boarding of the person-to-board is allowed in s5, the boarding pass processing unit 2 collates the face photograph read out from the ID card in s2 with the image of the face of the person-to-board which is picked up in s3, thereby judging the identity of the person-to-board (s7). If the identity of the person-to-board is negated in s7, the error processing is carried out in s6 and also the permission of the boarding of the person-to-board is canceled.

When in s7, the biometrics information of the person-to-board is achieved in s2, the judgment as to the identity of the person-to-board may be carried out by using the biometrics information.

The processing of s5, s7 may be changed in order.

The collation in s7 is performed by collating the face photograph read out from the ID card in s2 with, not the overall face, but some feature portions at plural places such as eyes, mouth, nose, etc. of the person-to-board picked up in s3, and if the similarity of each of these feature portions is equal to or higher than a predetermined value, the identity of the person-to-board is verified.

If the identity is verified in s7, the boarding pass processing unit 2 prints the face image of the person-to-board on the boarding pass accepted in s1 and print data coded every feature portion used for the identification in s7 in a barcode style on the boarding pass by the face image printing portion 23 (s8).

Figure 6B:
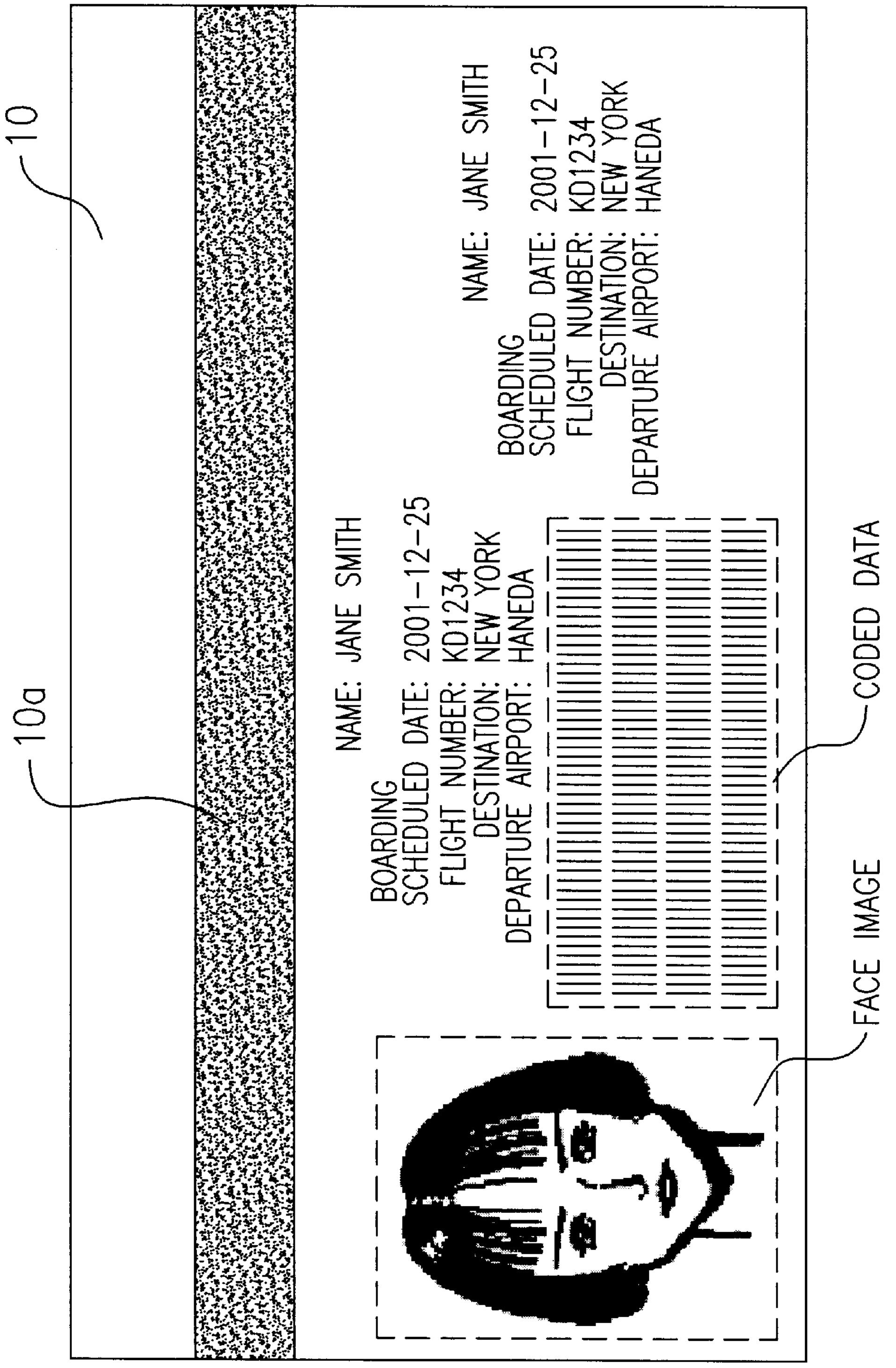

FIG. 6B is a diagram showing the boarding pass on which the face image of the person-to-board and the coded data of the feature portions are printed in s8. The face image of the person-to-board to be printed on the boarding pass 10 in s8 may be based on the face photograph of the person-to-board which is read out by the ID card reader 24 or the face image of the person-to-board which is picked up by the image pickup portion 25.

In the above embodiment, the data achieved by coding the feature portions used for the judgement in s7 are printed in the barcode style on the boarding pass 10. However, the data may be recorded as magnetic data. Further, the boarding pass 10 may be constructed by an IC card (any one of contact type and non-contact type may be used) to record the data as electronic data. Further, the coded data of the feature portions used for the judgment in s7 are not recorded in the boarding pass 10, but may be registered in the system server or the like. Further, the data may be separately recorded in a recording medium such as a floppy disc or the like. In this case, a recording medium may be delivered to each person-to-board and then withdrawn from each person-to-board at a boarding gate as described later.

The boarding pass processing unit 2 discharges the boarding pass 10 on which the face image of the person-to-board is printed in s8 (s9), and finishes this processing. The boarding pass 10 discharged in s9 is returned to the person-to-board.

The boarding pass processing unit 2 may be disposed not only in the airport, but also out of the airport. For example, it may be disposed at a travel agency shop or the like out of the airport to check the identity of a person-to-board before the person-to-board enters the airport.

A case where a person-to-board to which a boarding pass 10 shown in FIG. 6B is returned has not yet completed his/her check-in at this time will be described.

Specifically, a case where the person-to-board goes to the security check-in counter before going to the check-in counter and carries out the processing shown in FIG. 7 will be described.

Figure 8:
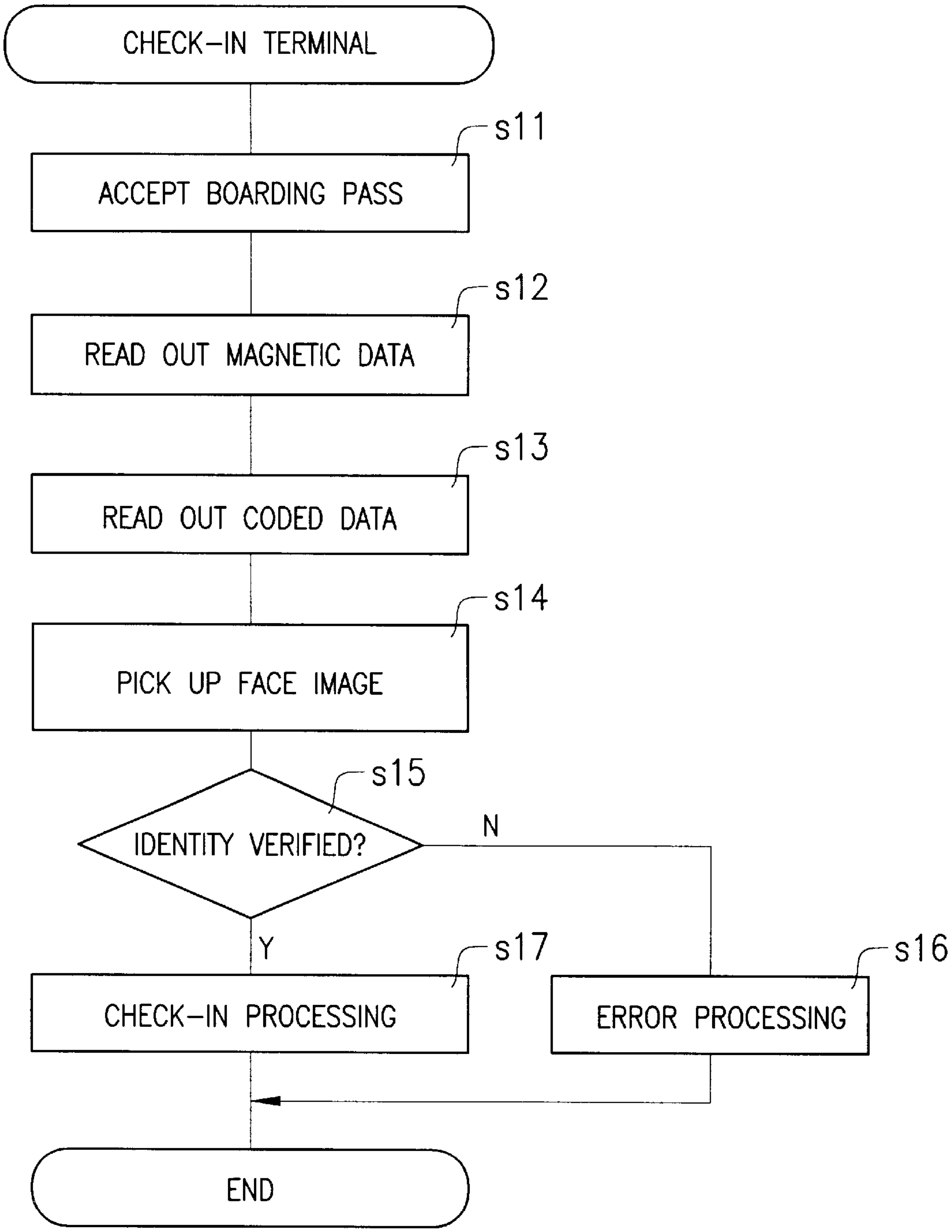
FIG. 8 is a flowchart showing the operation of the check-in terminal of the embodiment of the present invention.

In this case, the face image of the person-to-board and the coded data of the feature portions of the person-to-board have been already printed on the boarding pass 10 possessed by the person-to-board who goes to the check-in counter. FIG. 8 is a flowchart showing the operation of the check-in terminal 1 which takes in the boarding pass 10 having the face image of the person-to-board and the coded data of the feature portions printed thereon.

The check-in terminal 1 accepts the boarding pass 10 by the boarding pass processor 12 (s11) to read out the magnetic data recorded in the magnetic recording portion 10*a* (s12) and also read out the coded data of the feature portions printed on the surface of the boarding pass (s13).

When no coded data corresponding to the feature portions are recorded in the boarding pass 10, the check-in terminal 1 achieves the coded data concerned from a system server or a recording medium in which the coded data are recorded.

The check-in terminal 1 picks up a face image of the person-to-board by the image pickup portion 14 (s14), and collates the face image thus picked up with the coded data of the feature portions of the face of the person-to-board achieved in s13 to judge the identity of the person-to-board (s15). If the identity of the person-to-board is negated in s15, the error processing is carried out to prohibit the check-in of the person-to-board concerned. Conversely, if the identity of the person-to-board is verified in s15, the check-in processing of registering the person-to-board into the check-in list 5 is carried out (s17), and this processing is finished.

When the person-to-board goes to the security check-in counter before going to the check-in counter as described above, identification of the person-to-board having the boarding pass 10 is carried out at not only the security check-in counter, but also the check-in counter, so that the security can be more enhanced.

The person-to-board moves to the boarding gate while carrying the boarding pass 10 on which the face image is printed shown in FIG. 6B. When the security check is carried out on the person-to-board having the boarding pass on which the face image is printed, the clerk in charge requests the person-to-board to show his/her boarding pass 10. In response to this request, the person-to-board shows the boarding pass having the face image printed thereon. By merely comparing the face of the person-to-board with the face image printed on the boarding pass 10 shown by the person-to-board, the clerk in charge can easily verify whether the person-to-board concerned is the person who is identified at the security check counter.

Accordingly, the clerk in charge can carry out the security check on the person-to-board moving to the boarding gate. Further, the clerk in charge requests the person-to-board to show his/her ID card or the like in addition to the boarding pass 10, so that the person-to-board does not feel burdensome and the services to persons-to-board can be enhanced.

The person collation unit 7 is disposed at the X-ray examination place, the hand baggage custody place, etc. in the airport, and the identification of persons-to-board can be properly carried out at these places.

Figure 9:
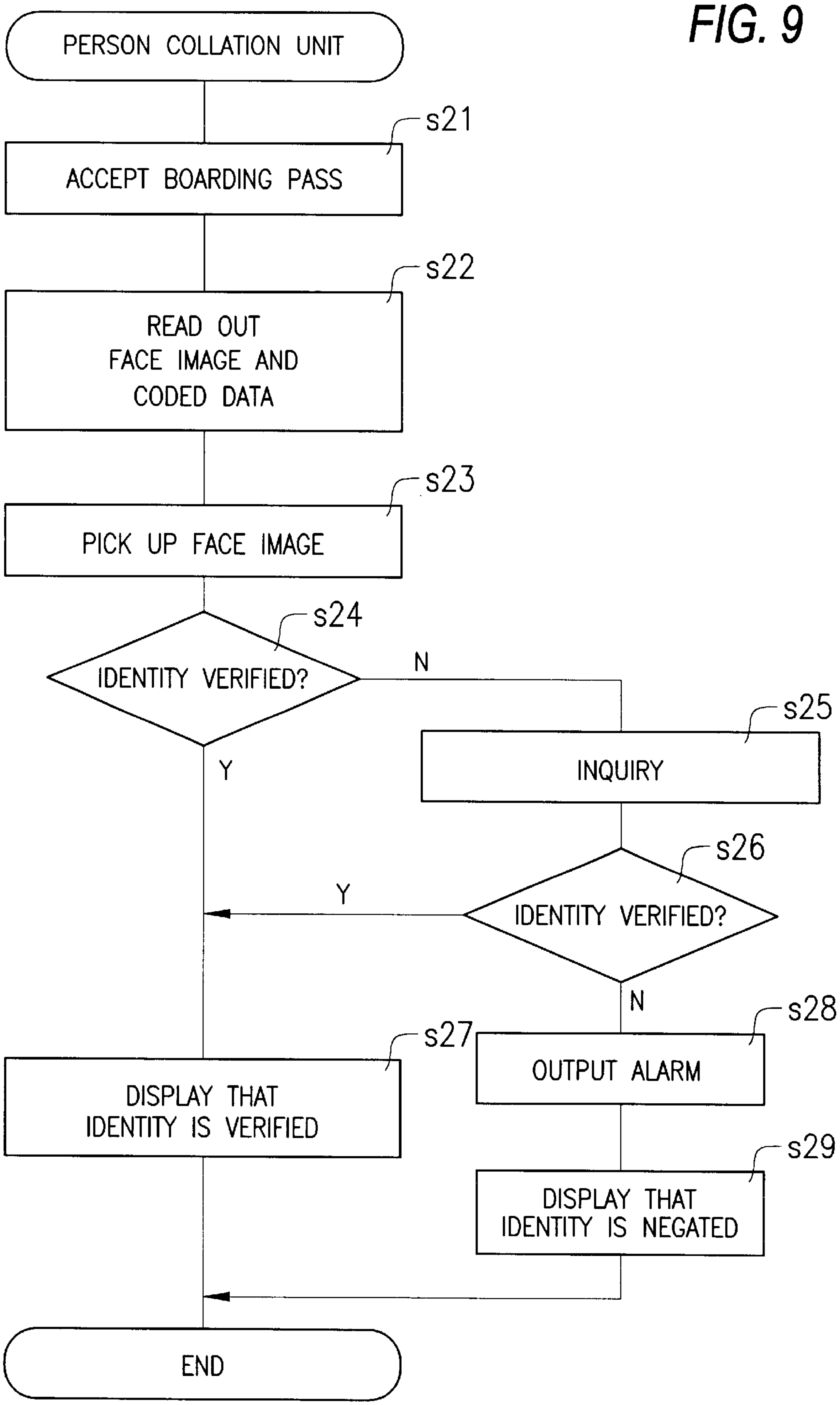
FIG. 9 is a flowchart showing the operation of the person collation unit according to the embodiment of the present invention.

FIG. 9 is a flowchart showing the operation of the personal collation unit.

When accepting the boarding pass 10 by the boarding pass processor 72 (s21), the person collation unit 7 reads out the face image printed on the surface of the boarding pass and the coded data of the feature portions (s22).

When no coded data of the feature portions is recorded on the boarding pass 10, the person collation unit 7 achieves the coded data from the system server or the recording medium in which the coded data are recorded.

The person collation unit 7 picks up a face image of a person-to-board by the image pickup portion 73 (s23), and collates the face image and the coded data of the feature portions of the person-to-board achieved in s22 with the face image thus picked up to judge the identity of the person-to-board (s24).

If it is impossible whether identity of the person-to-board is verified or negated, it is judged in s24 that the identity of the person-to-board is negated, and an inquiry is made to the center (s25). If the reply to this inquiry from the center indicates the identity of the person-to-board, this fact is displayed on the display portion 74 (s26, s27) If the identity is judged in s24, the fact that the identity is verified is also displayed on the display portion 74 in s27.

Conversely, if the reply from the center indicates negation of the identity of the person-to-board, an alarm sound is emitted and also this fact is displayed on the display portion 74 to be notified to the clerk in charge (s26, s28, s29).

Accordingly, the identification of the person-to-board can be also properly performed at the place where the person collation unit 7 is disposed, and the security can be further enhanced.

The person collation unit 7 may be disposed not only at the X-ray examination place and the check room, but also at other places.

Next, the boarding judgment to the person-to-board at the boarding gate will be described.

Figure 10:
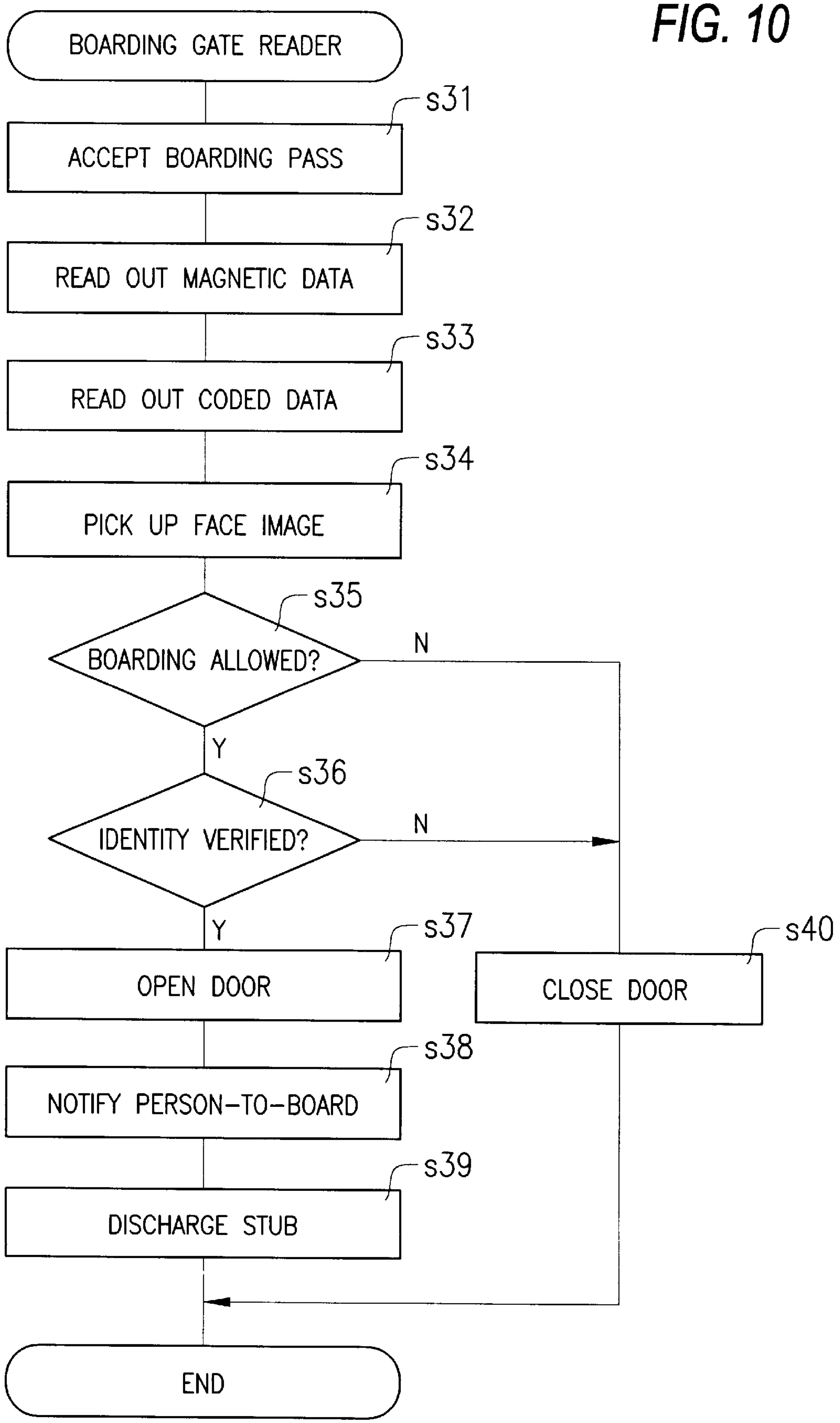
FIG. 10 is a flowchart showing the operation of the boarding gate reader according to the embodiment of the present invention.

Fig. 10 is a flowchart showing the operation of the boarding gate. Persons-to-board insert their own boarding pass 10 into the boarding gate reader 3 disposed at the boarding gate. The boarding gate reader 3 forms a passage through which the persons-to-board pass when they get on an airplane. The boarding gate reader 3 has a door for restricting the passage of the persons-to-board through the passage. The persons-to-board are prohibited from passing through the passage by closing the door to thereby prohibit the boarding of the persons-to-board.

When the boarding pass 10 is inserted (s31), the boarding gate reader 3 reads the magnetic data recorded in the magnetic recording portion 10*a* of the boarding pass 10 thus inserted (s32), and also reads out the coded data of the feature portions printed on the surface of the boarding pass 10 (s33).

When no coded data of the feature portions are recorded on the boarding pass 10, the boarding gate reader 3 achieves the coded data from the system server or the recording medium in which the coded data are recorded.

The boarding gate reader 3 picks up an image of the face of a person-to-board inserting the boarding pass 10 into the main body by the pickup portion 33 (s34). The boarding gate reader 3 judges on the basis of the magnetic data read out in s32 whether the boarding of the person-to-board is allowed or not (s35). If it is judged in s35 that the boarding of the person-to-board is allowed, the boarding gate reader 3 collates the face image of the person-to-board picked up by the image pickup portion 33 with the coded data of the feature portions read out from the boarding pass 10 to judge the identity of the person-to-board (s36).

Figure 11:
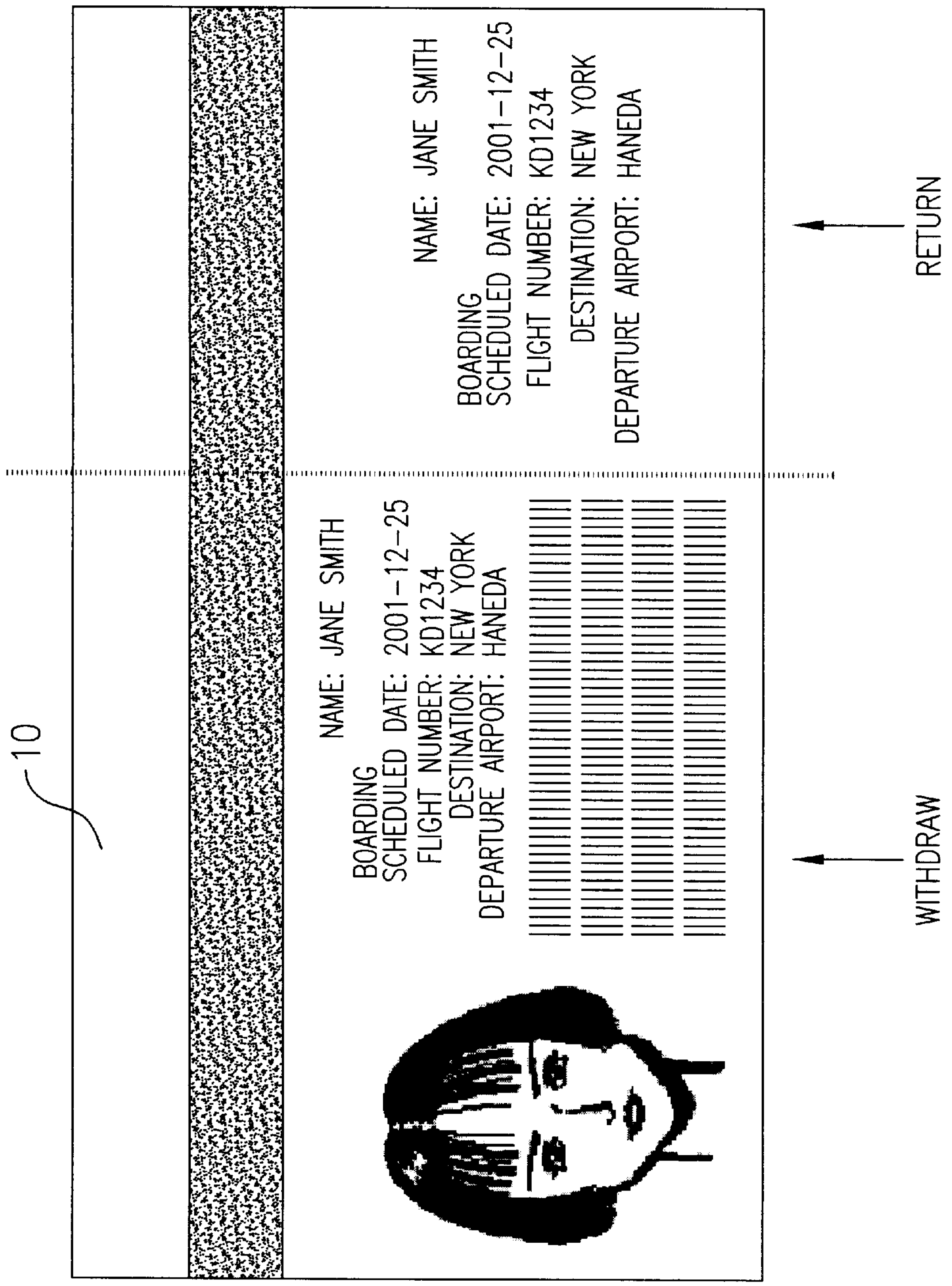
FIG. 11 is a diagram showing a boarding pass cut out by the boarding gate reader.

If the identity of the person-to-board is judged in s36, the boarding gate reader 3 opens the door to allow the boarding of the person-to-board concerned (s37). Conversely, if it is judged in s35 that the boarding is prohibited, and if the identity is negated in s36, the door is closed to prohibit the boarding of the person-to-board (s40). The boarding gate reader 3 notifies to the control terminal 4 the completion of the boarding of the person-to-board to which the boarding is allowed in s37 (s38), and also cuts out the boarding pass 10 inserted in the main body as shown in FIG. 11 One piece (right side) of the boarding pass thus cut is returned to the person-to-board, and the other piece (left side) is withdrawn (s39).

The control terminal 4 registers the person-to-board thus notified from the boarding gate reader 3 into the passenger list 6.

As described above, the boarding gate reader 3 withdraws one side piece of the boarding pass 10 at which the face image of the person-to-board is printed. Therefore, when the face image of a passenger getting on an airplane is needed, the face image of the passenger can be immediately achieved although the airplane has taken off.

Conversely, the portion of the accepted boarding pass 10 on which the face image of the person-to-board is printed may be cut out and discharged to the person-to-board while the remaining portion is withdrawn.

In this case, the person-to-board can use his/her face-image printed portion of the boarding pass for a subsequent identification check by a clerk in charge. For example, when a person-to-board intends to change his/her airplane at the arrival airport, the person-to-board can use the face-image printed portion to take his/her hand baggage at the arrival airport.

Further, the face image of each person-to-board may be printed on one side piece of a boarding pass to be returned to the person-to-board, so that the boarding pass (stub) on which the face image of the person-to-board himself/herself is printed can be delivered as a souvenir of his/her travel to the person-to-board, and the services to customers (persons-to-board) can be further enhanced.

Still further, face image data of wanted criminals may be registered as suspect data in a data base and collated with face images of persons-to-board picked up at the security check or when the persons-to-board pass through the boarding gate reader 3, whereby wanted criminals, etc. who forge ID cards or the like, assume false names and use the forged ID cards or the like can be prevented from boarding airplanes. Therefore, the security can be further enhanced.

Figure 12:
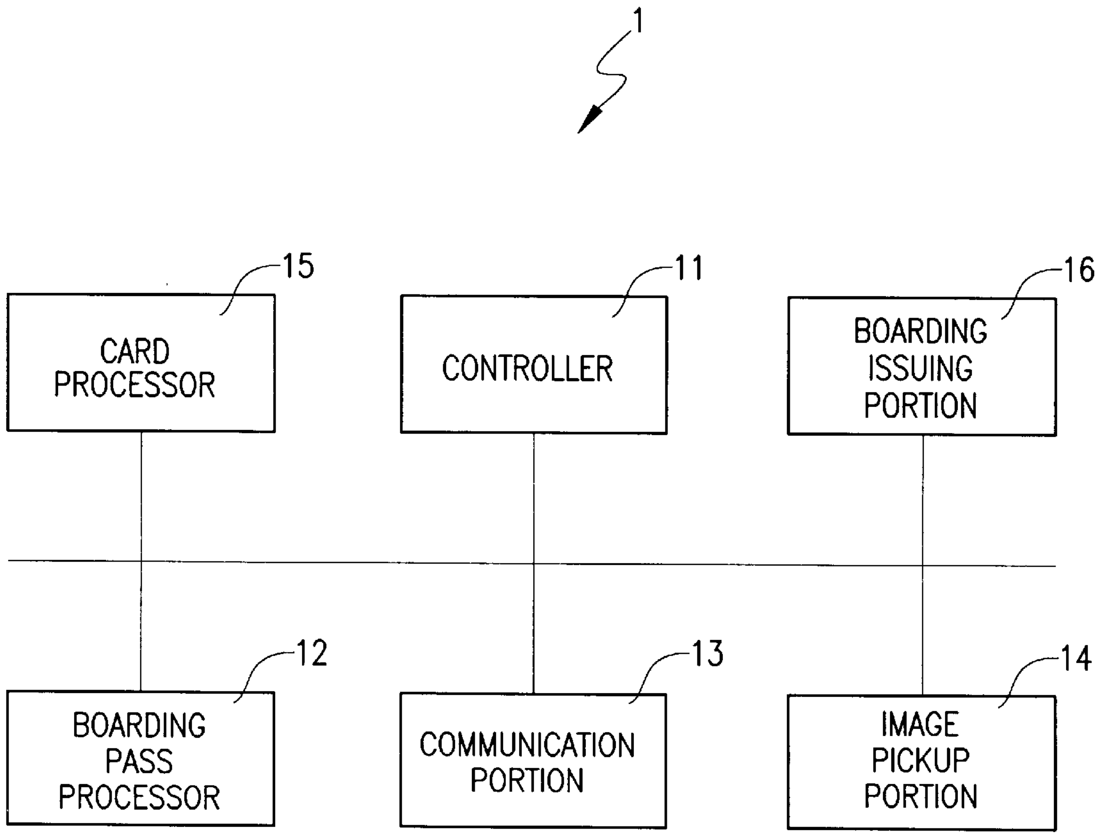
FIG. 12 is a diagram showing the construction of the check-in terminal according to another embodiment of the present invention.

The check-in terminal 1 may be provided with a function of issuing boarding passes. FIG. 12 is a diagram showing the construction of the check-in terminal 1 having the boarding pass issuing function. The same elements as shown in FIG. 2 are represented by the same reference numerals.

The check-in terminal 1 of this embodiment is constructed by adding the construction of FIG. 2 with a card processor 15 for accepting an ID card and a boarding pass issuing portion 16 for issuing a boarding pass 10.

In a general airline company, an IC card in which ID and face image data are recorded, for example, Smart Card is issued to each highly reliable customer as a privilege customer member of the airline company (Frequent Flyer).

Figure 13:
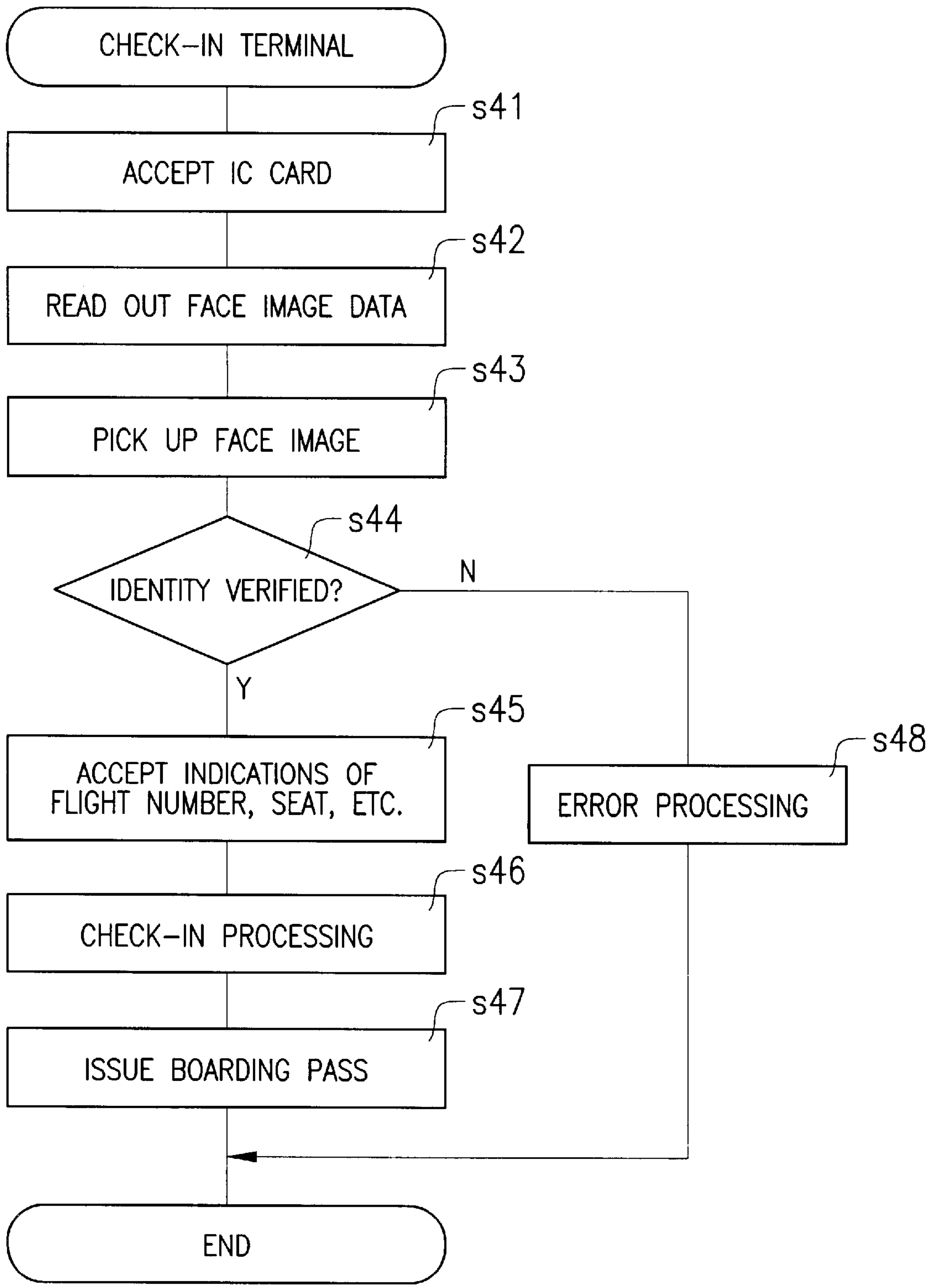
FIG. 13 is a flowchart showing the operation of the check-in terminal according to the other embodiment of the present invention.

FIG. 13 is a flowchart showing the operation of the check-in terminal of this embodiment.

When accepting an IC card by the card processor 15 (s41) the check-in terminal 1 reads out ID and the coded data of the face image of an owner which are recorded in the IC card (s42). The check-interminal 1 picks up a face image of a person inserting his/her IC card into the main body thereof by the image pickup portion 14 (s43).

The check-in terminal 1 collates the face image data read out from the IC card accepted in s42 with the face image picked up in s43 to judge whether the identity of the person-to-board is verified (s44). If the identity is verified in s44, the check-in terminal 1 accepts indications of a flight number, a seat, etc. (s45), and carries out the check-in procedures on the person-to-board concerned (s46). In addition, the check-in terminal 1 issues a boarding pass 10 shown in FIG. 6B on which the face image picked up in s43 is issued to the person-to-board (s47).

If the identity is negated in s44, the check-in terminal 1 carries out the error processing in s48 and finishes this processing.

Accordingly, with respect to highly reliable customers who are privilege customer members of airline companies, the check-in terminal 1 can perform the issuance of boarding passes 10 and also complete the check-in procedures. Further, since a face image has been already printed on a boarding pass 10 thus issued, the customer concerned is not needed to go to the check-in terminal 2. Accordingly, any highly reliable customer who is a privilege customer member of the airline company does not feel burdensome and thus the services can be further enhanced.

In the foregoing description, the check-in terminal 1 is provided with the function of issuing the boarding passes 10. However, a boarding pass issuing apparatus having the function of issuing the boarding passes 10 may be provided separately from the check-in terminal 1. In this case, a customer goes to the check-in terminal while carrying a boarding pass 10, and is subjected to the check-in procedures.

As described above, according to the present invention, with respect to persons-to-board whose identifies have been checked, the their face images are printed on their boarding passes, so that the clerk in charge can easily check in the airport whether the persons-to-board are proper owners of the boarding passes. Further, the security check of persons-to-board can be performed in the airport without requesting the persons-to-board to show their ID cards or the like, so that the persons-to-board do not feel burdensome and thus the services to the persons-to-board can be further enhanced. Further, persons-to-board whose face images are printed on their boarding passes have been identified, so that the security can be sufficiently maintained.

What is claimed is:

1. A boarding pass processing unit comprising:

a boarding pass accepting portion for accepting a boarding pass;

a control portion for identifying a person-to-board who is an owner of the boarding pass accepted by said boarding pass accepting portion, and judging whether the person-to-board should be allowed to board;

a face image acquiring portion for acquiring a face image of the person-to-board who is the owner of the boarding pass accepted by said boarding pass accepting portion;

a face image printing portion for printing the face image of the person-to-board acquired by said face image acquiring portion on the boarding pass accepted by said boarding pass accepting portion when said control portion judges that the person-to-board is allowed to board; and a boarding pass discharge portion for discharging the boarding pass on which the face image is printed by said face image printing portion.

2. The boarding pass processing unit as claimed in claim 1, further comprising a face image data recording portion for recording on the boarding pass face image data acquired by coding the face image printed on the boarding pass by said face image printing portion.

3. The boarding pass processing unit as claimed in claim 1, further comprising an identification card reader for reading an identification card, wherein said control portion identifies the person-to-board on the basis of information of the identification card read out by said identification card reader, and judges whether the person-to-board is allowed to board.

4. A boarding pass having a face image print area in which a face image is printed by said boarding pass processing unit as claimed in claim 1.

5. A boarding gate reader comprising:

a boarding pass processing portion for accepting a boarding pass on which a face image of a person-to-board is printed, and reading boarding data recorded on the boarding pass;

a face image data acquiring portion for acquiring face image data corresponding to coded face image of a person-to-board who is the owner of the boarding pass from which the boarding data are read out by said boarding pass processing portion;

an image pickup portion for picking up an image of a person passing through a passage; and a control portion for collating the face image data of the person-to-board acquired by said face image data acquiring portion with the face image picked up by said image pickup portion to identify the person-to-board, and prohibiting passage of the person-to-board when the identification of the person-to-board is negated.

6. The boarding gate reader as claimed in claim 5, wherein when said control portion judges that the identity of a person-to-board is verified, said boarding pass processing portion cuts out and withdraws a face-image printed portion of the boarding pass of the person-to-board, which is accepted by said boarding pass processing portion, and also discharges the remaining portion of the boarding pass.

7. The boarding gate reader as claimed in claim 5, wherein when said control portion judges that the identity of a person-to-board is verified, said boarding pass processing portion cuts out and discharges a face-image printed portion of the boarding pass of the person-to-board, which is accepted by said boarding pass processing portion, and also withdraws the remaining portion of the boarding pass.

8. A boarding system having said boarding pass processing unit as claimed in claim 1 and said boarding gate reader as claimed in claim 5.

9. A boarding gate reader as claimed in claim 5, wherein said boarding data comprises a name data for said person-to-board, a flight number associated with said person-to-board, a date associated with said flight number and a departure airport identification data.

10. A boarding gate reader as claimed in claim 4, wherein said control portion further collates at least one of said boarding data recorded on said boarding pass with at least one stored boarding data of said person-to-board in determining if passage of e person-to-board is prohibited.

11. A service kiosk for a boarding pass comprising:

a medium accepting portion for accepting insertion of a recording medium in which face image data corresponding to coded face image of an owner are recorded;

an image pickup portion for picking up an image of a person who inserts the recording medium accepted by said medium accepting portion;

a control portion for collating the face image data recorded in the recording medium accepted by said medium accepting portion with the face image of the person who inserts the recording medium, the face image being picked up by said image pickup portion;

an accepting portion for accepting indications of boarding data; and a boarding pass issuing portion for issuing a boarding pass indicated when the control portion verifies the identity of the person-to-board.

12. A service kiosk as claimed in claim 11, wherein said boarding data comprises a name data for said person-to-board, a flight number associated with said person-to-board, a date associated with said flight number and a departure airport identification data.

13. A person collation unit of the present invention comprising:

a boarding pass accepting portion for accepting a boarding pass on which face image data acquired by coding the face image of an owner is printed, said boarding pass further including boarding data;

an image pickup portion for picking up an image of a person who inserts the boarding pass accepted by said boarding pass accepting portion;

a control portion for collating the face image data recorded in the boarding pass accepted by said boarding pass accepting portion with the face image of the person who inserts the boarding pass, the face image being picked up by said image pickup portion to judge the identity of the person; and a display portion for displaying the judgment result in said control portion.

14. A person collation unit as claimed in claim 13, wherein said boarding data comprises a name data for said person-to-board, a flight number associated with said person-to-board, a date associated with said flight number and a departure airport identification data.

15. A boarding pass processing method comprising the steps of:

acquiring a face image of a person-to-board who is the owner of a boarding pass accepted by a boarding pass accepting portion and checking identity of the person-to-board to judge whether boarding of the person-to-board is allowed or not; and printing the face image of the person-to-board thus acquired on the boarding pass accepted by the boarding pass accepting portion when it is judged that the person-to-board is allowed to board.

16. A boarding gate reader comprising:

a boarding pass processing portion for accepting a boarding pass on which at least one of a plurality of first and second data and a first facial image of a person-to-board are included, and reading at least one of said plurality of first and second data recorded on a data storage portion of the boarding pass;

a display portion for displaying said first facial image from said boarding pass;

an image data capture portion, said image data capture portion is positioned to obtain a second facial image of a person attempting to proceed through a passageway, said second facial image corresponding to said first facial image of a person-to-board; and a control portion, said control portion authorizing boarding for said person-to-board based upon at least said plurality of first and second data, said first facial image and said second facial image from said image capture portion;

wherein said first plurality of data comprises personal identification data and said second plurality of data comprises conveyance related data.

17. A boarding gate reader as claimed in claim 16, wherein said personal identification data comprises a name data for said person-to-board and said conveyance information comprises a flight number associated with said person-to-board and a departure date and time associated with said flight number.

* * * * *